(12) United States Patent
Lommerts et al.

(10) Patent No.: US 8,197,589 B2
(45) Date of Patent: Jun. 12, 2012

(54) USE OF A (1>3)-β-D-GLUCAN AS AN EMULSION STABILISER

(75) Inventors: Bert Jan Lommerts, Heerhugowaard (NL); Quirinus Adrianus Nederpel, Monster (NL); Doetze Jakob Sikkema, Wageningen (NL); Joris Wilhelmus Peeters, Horn (NL)

(73) Assignee: Latexfalt, B.V., Rijn (NL)

( * ) Notice: Subject to any disclaimer, the term of this patent is extended or adjusted under 35 U.S.C. 154(b) by 0 days.

(21) Appl. No.: 12/922,191

(22) PCT Filed: Mar. 11, 2009

(86) PCT No.: PCT/NL2009/050116
§ 371 (c)(1),
(2), (4) Date: Nov. 17, 2010

(87) PCT Pub. No.: WO2009/113854
PCT Pub. Date: Sep. 17, 2009

(65) Prior Publication Data
US 2011/0168055 A1    Jul. 14, 2011

(30) Foreign Application Priority Data
Mar. 11, 2008  (EP) ..................... 08152592

(51) Int. Cl.
*C08L 95/00* (2006.01)
*C09J 195/00* (2006.01)
*C10C 3/00* (2006.01)

(52) U.S. Cl. ................. 106/277; 106/162.1; 106/217.8; 106/278; 516/38; 516/43; 523/518

(58) Field of Classification Search ............... 106/162.1, 106/217.8, 277, 278; 516/38, 43; 523/518
See application file for complete search history.

(56) References Cited

U.S. PATENT DOCUMENTS

| | | | |
|---|---|---|---|
| 5,246,986 A * | 9/1993 | Pierre et al. | .......... 524/68 |
| 5,667,577 A | 9/1997 | Chatterjee et al. | |
| 5,750,598 A | 5/1998 | Krivohlavek et al. | |
| 2007/0243321 A1 | 10/2007 | Antoine et al. | |

FOREIGN PATENT DOCUMENTS

| | | |
|---|---|---|
| EP | 0425380 | 10/1990 |
| EP | 0619079 | 12/1994 |
| EP | 0779070 | 12/1995 |
| EP | 1111010 | 11/2000 |
| EP | 1477171 | 5/2004 |
| JP | 2006262862 | 5/2006 |
| WO | WO 03/035657 | 1/2003 |

\* cited by examiner

*Primary Examiner* — Anthony J Green
(74) *Attorney, Agent, or Firm* — Edmonds & Nolte, PC

(57) ABSTRACT

The present invention relates to the use of a (1→3)-β-D-glucan as an emulsion stabilizer. The present invention further relates to emulsions comprising a (1→3)-β-D-glucan in an amount of 0.01 to 10 wt. %, based on the total weight of the emulsion. The present invention also relates to bitumen binder compositions comprising a (1→3)-β-D-glucan in an amount of 0.005 to less than 0.1 wt. %, based on the total weight of the bitumen binder composition. The present invention further relates to emulsions comprising a novel biodegradable emulsifying agent, in particular in combination with a (1→3)-β-D-glucan.

20 Claims, No Drawings

USE OF A (1>3)-β-D-GLUCAN AS AN EMULSION STABILISER

CROSS-REFERENCE TO RELATED APPLICATIONS

This application is a United States National Phase Application of International Patent Application No. PCT/NL2009/050116, filed on Mar. 11, 2009, which claims the benefit of EP Patent Application No. 08152592.5, filed on Mar. 11, 2008, both of which are incorporated by reference herein.

FIELD OF THE INVENTION

In its broadest aspect, the present invention relates to the use of a (1→3)-β-D-glucan as an emulsion stabiliser, such as an emulsion stabiliser for coatings, cosmetic products and bituminous binder compositions. A particular preferred embodiment according to the present invention concerns bitumen binder compositions. These bitumen binder compositions in particular have excellent storage stability as well as excellent breaking properties. The present invention also relates to emulsions comprising a novel cationic emulsifying agent, wherein these emulsions are in particular bitumen binder compositions.

BACKGROUND OF THE INVENTION

This invention concerns the stability of emulsions in general. As is well known in the art, emulsions may start to destabilise after a certain period of time. Emulsifiers when present may occur in either one or both phases. The separation process includes the steps of flocculation, coalescence (recombination of small droplets to larger droplets) and ultimately phase separation thereby forming a fully separated emulsion consisting of an upper oil layer and a lower aqueous layer. When the emulsion is a bitumen emulsion, this is different in that an aqueous top layer and a concentrated bitumen lower layer (often a sticky layer at the bottom which is very difficult to redisperse) are formed, because bitumen have a density at room temperature higher than the density of water.

The stabilisation of a two-phase emulsion involves decreasing the destabilisation rate which may be achieved by reducing the mobility of droplets dispersed in the continuous phase or liquid (i.e. by increasing the viscosity of the emulsion), by the insertion of an energy barrier between the droplets and the continuous phase or liquid, or both. Stabilisation is achieved by the addition of e.g. surfactants and polymers, also known as emulsifying agents.

Emulsions are employed in many industrial and food applications including cosmetic compositions, e.g. skin and hair preparations and make-up products, coatings and asphalt compositions. When used in asphalt compositions, these emulsions are usually composed of a bituminous binder and other components including an oil, an emulsifying agent and further additives such as a polymer as is well known in the art.

Emulsions of bituminous binders are frequently used in road construction and road repair. These emulsions are generally of the "oil-in-water" type and consist of a dispersion of an organic phase made up of small globules of the bituminous binder in a continuous aqueous phase, said aqueous phase containing an emulsifying system which promotes the dispersion of the small globules of the bituminous binder in the aqueous phase. The emulsifying system usually contains an emulsifying agent and optionally a pH regulating agent. The emulsifying agent may be anionic, cationic, non-ionic or amphotheric (or ampholytic). For example, U.S. Pat. No. 3,422,026, incorporated by reference herein, discloses besides emulsions comprising either anionic or cationic emulsifying agents, emulsions comprising amphotheric emulsifying agents. Making emulsions from a bituminous binder is a means to decrease the viscosity of the bituminous binder in operations wherein the bituminous binder is used and allows easy spraying. Emulsions of bituminous binders are fluids at ambient temperature and in the production of surface dressings a thickening agent is usually incorporated in the aqueous phase of the emulsion. The function of this thickening agent is to increase the viscosity of the emulsion to be spread on the support to be treated, so that the emulsion is kept in place on the support. Hence, before aggregate material or further asphalt layers are applied, a uniform layer of the emulsion on the support is guaranteed. Additionally, "cationic" emulsions are known in the art as having a pH of not more than 7 and contain cationic emulsifying agents, e.g. a fatty amine, whereas "anionic" emulsions are known in the art as having a pH of more than 7 and contain anionic emulsifying agents, e.g. a fatty acid metal salt.

Important properties of emulsions of bituminous binders are storage stability, processing properties, breaking properties and adhesive properties. Upon storage, emulsions tend to "break" or separate which is obviously undesired since they can then no longer be processed. However, common techniques for enhancing the storage stability of the emulsions often lead to poorer breaking properties, i.e. that breaking of the emulsion requires more time. It is well known in the art that when applied rapid and uniform breaking of emulsions of bituminous binders are advantageous for efficient workability, i.e. a short time to achieve breaking (full solidification) even under cold and humid weather conditions, which has the advantages that the treated road surface can be used shortly after a resurface of the road surface and that less damages occur during early use of the road surface.

Another problem in the art is that usually hard bituminous binders, in particular bituminous binders having a penetration according to ASTM D5-97 less than about 100 $10^{-1}$ mm, require extensive stabilisation for storage, in particular for long-term storage. This extensive stabilisation also leads to poorer breaking properties.

U.S. Pat. No. 4,137,204, incorporated by reference herein, discloses asphalt emulsions containing polysaccharides, e.g. boiled corn starch, cellulose derivatives such as carboxymethylcellulose and hydroxyethyl cellulose, as thickening agents. An example of such a polysaccharide is Natrosol® 250 of Hercules.

U.S. Pat. No. 4,548,966, incorporated by reference herein, discloses an asphalt emulsion wherein a cross-linked starch is used as a thickener.

U.S. Pat. No. 4,879,326, incorporated by reference herein, discloses cationic emulsions that optionally comprise thickening agents selected from the group of water soluble natural gums and water soluble polyurethanes having a low molecular weight, i.e. below 20.000.

U.S. Pat. No. 5,246,986, incorporated by reference herein, discloses an emulsion of a bituminous binder wherein a thickening agent is employed that contains at least 40% by weight of scleroglucan, wherein it is preferred that the aqueous phase of the emulsion comprises 100 to 5000 ppm, preferably 200 to 2000 ppm of scleroglucan. Scleroglucan (CAS No. 39464-87-4) is known as a (1→3)-β-D-glucan having also (1→6)-β-D-linkages, wherein the polymer has glucopyranose side chains, and can be obtained from e.g. *Sclerotinia sclerotiorum* and *Saccharomyces cerevisiae*. The structural formula of scleroglucan is shown below for illustrative purposes:

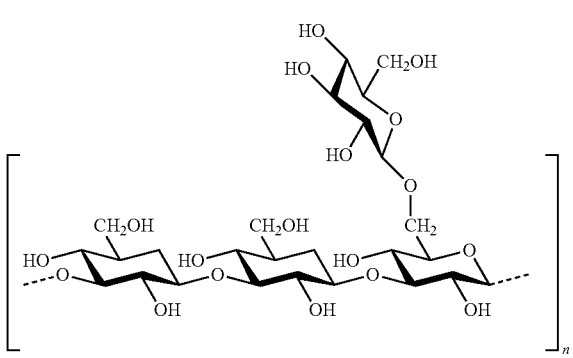

Glucans are polymers of glucose and are commonly found in the cell walls of bacteria, fungi, yeast, and various plant species. A common glucan is a β-(1,3)-linked glucopyranose (commonly referred to as β-glucan). Other common examples include mixtures of β-(1,3)-linked glucopyranose with β-(1,4)-linked glucopyranose or β-(1,6)-linked glucopyranose.

Accordingly, there is a need in the art to provide emulsions in general and in particular emulsions of bituminous binders that have excellent storage stability and which break rapidly. There is also a need in the art to provide emulsions of bituminous binders which comprise hard bitumen and which still have excellent storage stability and which break rapidly upon application.

It is well documented that emulsion from harder grade bitumen can be applied as non-sticky tack or bond coats, i.e. the adhesive layer between two asphalt layers. The use of harder bitumen is causing less contamination of the environment as at ambient temperatures the broken bitumen emulsion will not stick to the tires of the asphalt trucks feeding the asphalt paving machine. Softer bitumen stick easily to truck tires at temperatures exceeding 30° C. and will subsequently cause black smears on the pavements surrounding the job. This causes a great nuisance especially when the asphalt trucks have to drive over coloured pavements, e.g. the popular red coloured bicycle lanes in the Netherlands (cf. for example US 2007105987, incorporated by reference).

In the southern part of Europe, 35-50 penetration grade bitumen is often used for non-sticky tack or bond coats. However, emulsions comprising such bitumen have to be handled with great care to avoid clogging and blocking of the nozzles of the tack coat spraying trucks. For example, it is regular practice that after a spraying job with non-sticky tack coat, the truck has to be discharged and sometimes even thoroughly cleaned to avoid clogging and sedimentation of the emulsion. It is obvious for experts in the field that harder grade bitumen will even cause more severe problems. Although 20-30 or even 10-20 bitumen are preferred during hot summers, the mediocre stability of these emulsions does not allow processing these materials in a practical and efficient manner.

As for example disclosed in U.S. Pat. No. 4,137,204, incorporated by reference, a bitumen emulsion can be stabilized with different polysaccharides as these materials act as thickeners. One of the important driving forces for sedimentation of bitumen emulsion is the density difference between the bitumen globules and the surrounding aqueous phase. Hence, the storage stability can be improved by increasing the viscosity of the aqueous phase which concomitantly increases the hydrodynamic frictional forces on the bitumen globules during sedimentation.

However, most of the commercially available cationic tack or bond coat emulsions have a pH close to 2. When stored at elevated temperatures, i.e. 50°-70° C., the molecular weight of the polysaccharides disclosed in U.S. Pat. No. 4,137,204 will drop due to acid catalyzed hydrolysis. A noticeable decrease in viscosity of polysaccharide-thickened bitumen emulsions is observed within a few days. Hence, it is favourable to use emulsion modifiers which are not or less sensitive towards acid catalyzed hydrolysis so that the emulsion demonstrates a constant quality for a prolonged period in time.

D. Bais et al., J. Colloid Int. Sci. 290, 546-556, 2005, discloses cosmetic O/W emulsions comprising 0.2 to 1.2 wt. % scleroglucan.

S. C. Viñarta et al., Int. J. Biol. Macromol. 41, 314-323, 2007, discloses the use of gel matrices comprising 2 wt. % scleroglucan as drug delivery vehicles.

JP 2006-262862 discloses a cheese cake comprising a cheese head, a thickening stabilizer, an emulsion stabilizer and a gelling agent, wherein the emulsion stabilizer contains at least a polysaccharide. The polysaccharide is curdlan.

EP 619.079 discloses the use of curdlan as an emulsion stabilizer for enhancing dissolution of the outer coating of a feed additive composition. No amounts or ranges are mentioned.

EP 1.477.171 discloses the use of curdlan as emulsion stabilizer in a food additive. No amounts or ranges are mentioned.

U.S. Pat. No. 5,750,598 discloses that scleroglucan can be used as a viscosity-controlling additive in aqueous bitumen emulsions.

WO 2006/066643 discloses the use of choline esters in dermo-pharmaceutical and cosmetic products.

SUMMARY OF THE INVENTION

In a first aspect, the present invention relates to the use of a (1→3)-β-D-glucan as an emulsion stabiliser.

In a second aspect, the present invention relates to emulsions, preferably provided that the emulsions are not a bitumen binder emulsion, comprising a (1→3)-β-D-glucan in an amount of 0.01 to 10 wt. %, based on the total weight of the emulsion.

In a third aspect, the present invention relates to bitumen binder compositions comprising a (1→3)-β-D-glucan in an amount of 0.005 to less than 0.1 wt. %, based on the total weight of the bitumen binder composition.

In a fourth aspect, the present invention relates to emulsions comprising a novel biodegradable emulsifying agent.

In a fifth aspect, the present invention relates to emulsions comprising a novel biodegradable emulsifying agent in combination with a (1→3)-β-D-glucan.

According to a sixth aspect, the present invention, relates to a bituminous binder composition comprising a novel biodegradable emulsifying agent in combination with a (1→3)-β-D-glucan.

According to a seventh aspect, the present invention relates to bitumen binder compositions comprising a novel biodegradable emulsifying agent.

DETAILED DESCRIPTION OF THE INVENTION

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

The term "emulsion" is to be understood as a system in which liquid droplets and/or liquid crystals are dispersed in a liquid. In emulsions the droplets often exceed the usual limits for colloids in size. An emulsion is denoted by the symbol O/W if the continuous phase is an aqueous solution and by W/O if the continuous phase is an organic liquid (an "oil"). More complicated emulsions such as 0/W/0 (i.e. oil droplets contained within aqueous droplets dispersed in a continuous oil phase or three-phase emulsions) are also included by the term "emulsion". Photographic emulsions, although colloidal systems, are not emulsions in the sense of the term "emulsions" as used in this document (cf. International Union of Pure and Applied Chemistry, Manual of Symbols and Terminology for Physiochemical Quantities and Units, Appendix II, Definitions, Terminology, and Symbols in Colloid and Surface Chemistry, Part 1, web version 2001). The type of emulsion (O/W or W/O) is determined by the volume ratio of the two liquids. For example, with 5% water and 95% oil (an O/W phase ratio of 19), the emulsion is usually W/O.

In this document, "hard" bitumen (first bitumen) is to be understood as a bitumen having a penetration of about 10 to about 100 $10^{-1}$ mm according to ASTM D5-97. On the other hand, "soft" bitumen (second bitumen) is to be understood as having a penetration of about more than about 100 to about 350 $10^{-1}$ mm according to ASTM D5-97. As is well known in the art, the unit for penetration according to ASTM D5-97 is "$10^{-1}$ mm".

The (1→3)-β-D-Glucan

As is known in the art, (1→3)-β-D-glucans may have different types of linkages. According to the invention, it is preferred that the (1→3)-β-D-glucan has also (1→6)-β-D-linkages. It is also preferred that the polymer has glucopyranose side chains.

According to the invention, the glucan is selected from the group consisting of scleroglucan (CAS No. 39464-87-4), schizophyllan (CAS No. 9050-67-3), laminaran (CAS No. 9008-22-4), cinerean, lentinan (CAS No. 37339-90-5) and curdlan (CAS No. 54724-00-4). However, curdlan is less preferred because of its low water solubility at acidic pH. Most preferably, the glucan is scleroglucan.

According to the present invention, it is preferred that the (1→3)-β-D-glucan is a non-modified (1→3)-β-D-glucan.

According to the present invention, it is preferred that the solubility of the (1→3)-β-D-glucan in water (20° C., pH=6) is at least 20 wt. %.

According to the present invention, the (1→3)-β-D-glucan is employed as a dispersion in an apolar non-hydrophillic, liquid medium, preferably a vegetable oil.

Emulsions in General

The present inventors have found that a (1→3)-β-D-glucan has a remarkable and unexpected stabilising effect on emulsions in general and that only minor quantities of the (1→3)-β-D-glucan are necessary for achieving this effect. It further appears that the mode of addition of the (1→3)-β-D-glucan may be varied widely in the manufacturing process of emulsions. For example, the (1→3)-β-D-glucan may be added to the aqueous phase before emulsification or it may be added to the finalised emulsion. Consequently, the (1→3)-β-D-glucan is widely applicable as an emulsion stabiliser or emulsion stabilising agent, e.g. in emulsions for road construction and repair, emulsions for cosmetic purposes, emulsions for coatings, emulsions for food products and the like.

Accordingly, it is preferred that according to the second aspect of this invention that the emulsion, preferably provided that the emulsions is not a bitumen binder emulsion, comprises a (1→3)-β-D-glucan in an amount of 0.01 to 10 wt. %, based on the total weight of the emulsion, and preferably 0.01 to 5.0 wt. %, based on the total weight of the bituminous binder composition, more preferably 0.01 to 2.5 wt. %, even more preferably 0.02 to 1.5 wt. %, yet even more preferably 0.02 to 1.0 wt. %, yet even more preferably 0.02 to 0.5 wt. % and in particular 0.02 to 0.2 wt. %. It is even possible to prepare emulsions comprising a (1→3)-β-D-glucan in an amount of 0.005, preferably 0.01, to 0.02 wt. % and 0.005, preferably 0.01, to 0.015 wt. %, According to the fourth aspect of this invention, the present invention relates to emulsions in general, i.e. without the (1→3)-β-D-glucan, which comprise a cationic emulsifying agent selected from the group of betaine glycines of formula (II) and choline derivatives of formula (III) which are disclosed below, said emulsions comprising the cationic emulsifying agent in an amount of about 0.01 to about 20 wt. %, based on the total weight of the emulsion. The amount of cationic emulsifying agent is preferably 0.01 to 10.0 wt. %, based on the total weight of the bituminous binder composition, more preferably 0.01 to 5 wt. %, even more preferably 0.02 to 2.5 wt. %, yet even more preferably 0.02 to 1.0 wt. %, yet even more preferably 0.02 to 0.5 wt. % and in particular 0.02 to 0.2 wt. %.

According to the fifth aspect of the present invention, it relates to emulsions comprising a novel biodegradable emulsifying agent in combination with a (1→3)-β-D-glucan, said emulsions comprising the cationic emulsifying agent in an amount of about 0.01 to about 20 wt. %, based on the total weight of the emulsion, and the (1→3)-β-D-glucan in an amount of 0.01 to 10 wt. %, based on the total weight of the emulsion. Preferred ranges of the cationic emulsifying agent are 0.01 to 10.0 wt. %, based on the total weight of the bituminous binder composition, more preferably 0.01 to 5.0 wt. %, even more preferably 0.02 to 2.5 wt. %, yet even more preferably 0.02 to 1.0 wt. %, yet even more preferably 0.02 to 0.5 wt. % and in particular 0.02 to 0.2 wt. %. Preferred ranges of the (1→3)-β-D-glucan are 0.01 to 5.0 wt. %, based on the total weight of the bituminous binder composition, more preferably 0.01 to 2.5 wt. %, even more preferably 0.02 to 1.5 wt. %, yet even more preferably 0.02 to 1.0 wt. %, yet even more preferably 0.02 to 0.5 wt. % and in particular 0.02 to 0.2 wt. %.

The emulsions according to the present invention comprises preferably about 25 to about 75 wt. % of an aqueous phase and about 75 to about 25 wt. % of an oil phase, based on the total weight of the emulsion.

The Bituminous Binder Composition

The bitumen employed in the emulsions of the present invention may either be straight run products or processed products (cf. Kirk-Othmer, Encyclopedia of Chemical Technology, 4th Ed., Vol. 3, pages 689-724).

According to the third aspect of the present invention, it concerns bituminous binder compositions comprising a (1→3)-β-D-glucan in an amount of 0.005 to less than 0.1 wt. %, based on the total weight of the emulsion, and preferably 0.01 to 0.07 wt. %, even more preferably 0.01 to 0.04 wt. %. Even more preferably, these emulsified bituminous binder compositions comprise a (1→3)-β-D-glucan as defined above in an amount of 0.005 to 0.020 wt. %, more preferably 0.005 to 0.015 wt. %, based on the total weight of the emulsion. The ranges according to this third aspect are in particular preferred when the bituminous binder composition does not comprise a biodegradable emulsifying agent selected from the group consisting of betaine esters according to formula (II) or choline ester derivatives according to formula (III) but conventional emulsifying agents.

According to the fifth aspect of the invention, it relates to bituminous binder compositions comprising a novel biodegradable emulsifying agent in combination with a (1→3)-β-D-glucan, said emulsions comprising the cationic emulsifying agent in an amount of about 0.01 to about 20 wt. %, based on the total weight of the emulsion, and the (1→3)-β-D-glucan in an amount of 0.01 to 50 wt. %, based on the total weight of the emulsion. Preferred ranges of the cationic emulsifying agent are 0.01 to 10.0 wt. %, based on the total weight of the bituminous binder composition, more preferably 0.01 to 5.0 wt. %, even more preferably 0.02 to 2.5 wt. %, yet even more preferably 0.02 to 1.0 wt. %, yet even more preferably 0.02 to 0.5 wt. % and in particular 0.02 to 0.2 wt. %. Preferred ranges of the (1→3)-β-D-glucan are 0.01 to 5.0 wt. %, based on the total weight of the bituminous binder composition, more preferably 0.01 to 2.5 wt. %, even more preferably 0.02 to 1.5 wt. %, yet even more preferably 0.02 to 1.0 wt. %, yet even more preferably 0.02 to 0.5 wt. % and in particular 0.02 to 0.2 wt. %.

According to the invention, it is preferred that the bituminous binder is selected from the group consisting of paraffinic and naphtenic bitumen. Preferably, the paraffinic or naphtenic bitumen have a penetration in the range of about 10 to about 350 $10^{-1}$ mm according to ASTM D5-97, more preferably about 70 to about 220 $10^{-1}$ mm.

According to the present invention, the amount of the (1→3)-β-D-glucan used in bituminous binder compositions is such that thickening of the bituminous binder compositions does essentially not occur and is far less than the minimum amount employed in the invention that is disclosed in U.S. Pat. No. 5,246,986.

This invention also permits the use of relative hard bitumen, i.e. bitumen having a penetration of according to ASTM D5-97 about 100 $10^{-1}$ mm or less, in particular a penetration of 100 $10^{-1}$ mm to about 10 $10^{-1}$ mm, in manufacturing emulsions of bituminous binder compositions having an improved storage stability. In contrast, in the examples disclosed in U.S. Pat. No. 5,246,986 only "emulsifiable" bitumen are employed, i.e. soft bitumen having a penetration in the range of 140-160 and 180-220, whereas it is said that bitumen having a penetration in the range of 5 to 500 (according to NF standard T 66004) can be used.

A disadvantage of fast breaking bitumen emulsions comprising hard bitumen is that wetting of dust on road surfaces, wetting of grinded asphalt layers and the coalescence of bitumen droplets to form a homogeneous coherent film is less than for bitumen emulsions from softer grade bitumen. The addition of the (1→3)-β-D-glucan, e.g. scleroglucan, allows mixing of two types of emulsions produced using the same emulsifier. Hence, a so-called bimodal bitumen emulsion can be produced in which a relatively small amount of a softer bitumen emulsion acts a coalescence agent to increase the coherence and bonding in the bitumen film. The bitumen phase in these bimodal emulsion may consist of 80-98 wt. % of 10-20 to 70-100 bitumen and 2-20 wt. % of 100-150 to 260-320 bitumen.

The bitumen emulsion according to the present invention may therefore comprise a blend of bitumen emulsions having a different degree of penetration of the starting bitumen as will be disclosed in more detail below. It is preferred that the bitumen comprises a blend of a soft bituminous emulsion and a hard bituminous emulsion, i.e. a hard bitumen is used as a starting material for the emulsion having a penetration of about 100 $10^{-1}$ mm or less according to ASTM D5-97, preferably about 100 or less to about 10 $10^{-1}$ mm, more preferably of about 60 to about 10 $10^{-1}$ mm, even more preferably about 50 to about 20 $10^{-1}$ mm, and a soft bitumen having a penetration of more than about 100 $10^{-1}$ mm according to ASTM D5-97, preferably more than about 100 or about 350 $10^{-1}$ mm, more preferably of more than about 100 to about 220 $10^{-1}$ mm, even more preferably about 160 to about 220 $10^{-1}$ mm. The blend preferably comprises a weight ratio of a soft bitumen to a hard bitumen in the range of 1 to 30, more preferably in the range of 1 to 10.

Asphalt pavements are usually constructed in a number of layers. At present, most of pavement design and evaluation techniques assume that adjacent layers are fully bonded together without any relative displacement. However, it seems that good bonding is not always achieved since a number of pavement failures have been linked with poor bond condition. Bond is critical to transfer radial tensile and shear stress into the underlying layer and furthermore to the whole of pavement structure. To achieve the required pavement performance, good bonding is very important. However, up to the present, no specification limit exists related to the required and achievable shear strength of a range of road constructions and material combinations.

To measure the shear strength or shear modulus of the adhesive layer between asphalt layers, the so-called Leutner test can be used. In this test a torsion tensile test is performed on 100 or 150 mm cylindrical test samples. The inventors found that when harder grade bitumen are used the shear forces as measured using the Leutner test are higher than for softer grade bitumen. For example the shear force when a tack coat made out of a 10-20 bitumen is about three to four times higher than when a 160-220 tack coat is used.

For surfacing dressing (or chip seal) emulsions the addition of elastomers to the emulsion bitumen phase will increase the life expectancy of the road as the mechanical (elastic) properties of the binder are improved.

The bituminous binder compositions according to the invention therefore preferably comprise an elastomer. Elastomers are usually added to the bituminous binder composition to improve properties, e.g. rutting resistance, of the bitumen. Also cohesion of porous asphalt layers is improved thus reducing the degradation thereof by ravelling, i.e. separation of the aggregates from the asphalt surface. Finally, elastomers are necessary to obtain a strong, yet flexible and sufficiently plastic binding material. Although elastomers are sufficiently compatible with bitumen, they can be detrimental to processability in that they cause too high a viscosity. In some cases this requires the addition of solvents and/or fluxing oils to lower the viscosity and to improve solubility of the elastomers in the bitumen and the processing and application of the bituminous binder composition. Preferably the elastomer is selected from the group consisting of ethylene-vinyl acetate copolymers, polybutadienes, ethylene-propylene copolymers, ethylene-propylene-diene copolymers, butadiene-styrene diblock copolymers, butadiene-styrene-butadiene triblock copolymers, isoprene-styrene diblock copolymers, isoprene-styrene-isoprene triblock copolymers, wherein the diblock or triblock copolymers may occur in morphological shapes as star-shaped polymers wherein a cross-linking agent such as divinyl benzene is employed in the manufacturing process. However, according to the present invention, it is preferred that the elastomer is a polymer or a resin comprising two adjacent, optionally substituted butadiene units such as isoprene, most preferably a polybutadiene, a butadiene-styrene diblock copolymer, a styrene-butadiene-styrene triblock terpolymer, a isoprene-styrene diblock copolymer or a styrene-isoprene-styrene triblock terpolymer. More preferably, the elastomer is a polybutadiene or a styrene-butadiene-styrene triblock terpolymer, in particular because of their good compatibility with bitumen and its excellent visco-elastic properties. In the bituminous binder composition according to the present invention, the elastomer content is preferably 0.1 to 7.0 wt. %, more preferably 0.5 to 5.0 wt. %, of the elastomer, based on the total weight of the bituminous binder composition.

According to the seventh aspect of the present invention, the present invention relates to bituminous binder compositions and a biodegradable emulsifying agent selected from the group consisting of alkylpolyglycosides according to formula (I), betaine glycines according to formula (II) and betaine esters according to formula (III). Most preferred biodegradable emulsifying agents are the betaine esters according to formula (III). These biodegradable emulsifying agents are disclosed in more detail below. The bituminous binder compositions preferably comprise about 0.01 to about 20 wt. % of the biodegradable emulsifying agent, based on the total weight of the bituminous binder composition.

The Emulsion of the Bituminous Binder Composition

The present inventors observed that the viscosity of (1→3)-β-D-glucan-modified bitumen emulsions is more or less constant when stored at temperatures between 50 and 70° C. Furthermore, additives used to stabilize acidic cationic emulsions, like tack coat emulsions and surface dressing emulsions, should be sufficiently stable at relatively low pH values at temperatures between 30° and 80° C. to avoid the deterioration of these additives in order to assure a constant quality during prolonged storage. Surprisingly it was found that the polysaccharides as described in this invention do not result in a significant drop in viscosity when stored at 50° C. under acidic conditions. This indicates that the stabilizing effect of the polysaccharide is more or less constant during prolonged storage.

Furthermore, the inventors have demonstrated that only very small amounts of a (1→3)-β-D-glucan are sufficient to achieve a significant effect on the stability. Without being bound by theory, the present inventors assume that the mechanism of stabilisation cannot be explained by a possible increase of the hydrodynamic frictional forces acting on the bitumen globules since the thickening effect at these low concentrations is negligibly small. An even more surprising observation was that when a (1→3)-β-D-glucan was added to the aqueous phase of the emulsions, only a very small portion of the polysaccharide dissolved under the experimental conditions. Industrial grades of (1→3)-β-D-glucans have a purity ranging from about 20 to about 95% and it is assumed that the impurities present in the glucan polymer do not contribute to the observed stabilizing effect of cationic emulsions. The undissolved fraction which contains most of the impurities was subsequently filtered off and the aqueous filtrate was used to produce a bitumen emulsion. This emulsion demonstrates the same storage stability as a bitumen emulsion which was produced from an unfiltered aqueous phase. Obviously, both emulsions demonstrated significant better storage stability than an emulsion produced without any (1→3)-β-D-glucan addition to the aqueous phase.

U.S. Pat. No. 5,246,986, on the other hand, discloses bituminous binder compositions comprising a thickening agent which comprises at least 40% by weight of scleroglucan. In these bituminous binder compositions, scleroglucan is used as a thickener, i.e. that scleroglucan increases the viscosity of the emulsions of bituminous binder compositions. However, the present inventors have surprisingly found that (1→3)-β-D-glucan such scleroglucan enhances the intrinsic stability of emulsions of bituminous binder compositions, which results in an improved storage stability and an improved shear stability.

The bitumen emulsion according to the present invention comprises preferably about 25 to about 75 wt. % of an aqueous phase and about 75 to about 25 wt. % of an oil phase, based on the total weight of the bitumen emulsion, wherein the oil phase is made up by the bitumen binder composition disclosed above. However, it will be apparent to the person skilled in the art that the oil phase may be of synthetic origin as will be disclosed in more detail below. More preferably, the bitumen emulsion according to the present invention comprises about 70 to about 30 wt. % of an aqueous phase and about 30 wt. to about 70 wt. % of an oil phase.

According to a particular preferred embodiment of the present invention, the bitumen emulsion comprises a blend of a bitumen emulsion comprising a hard bitumen and a bitumen emulsion comprising a soft bitumen. Emulsions comprising such blends have the advantage that desires properties can easily be attained.

The bitumen emulsions according to the present invention preferably comprise next to the (1→3)-β-D-glucan at least one emulsifying agent selected from the group consisting of anionic, cationic, non-ionic or amphoteric emulsifying agents. Preferably, the emulsifying agents are selected from biodegradable emulsifying agents. Such biodegradable emulsifying agents may partly or completely be based on vegetable feedstocks. For example, emulsifying agents that are partly based on vegetable feedstocks are products obtained from the reaction of synthetic polyamines and fatty acid derivatives. However, the invention is not restricted to biodegradable emulsifying agents which are partly or completely based on vegetable feedstocks as will be apparent to those skilled in the art. Synthetic chemicals having the same structure as the biodegradable emulsifying agents disclosed herein which are partly or completely based on vegetable feedstocks are also included in this invention. Although these synthetic chemicals are produced via chemical synthesis, their structure assures good bio-compatibility and excellent non-ecotoxicity. Emulsifying agents that are completely based on vegetable feedstocks are disclosed in U.S. Pat. No. 6,117,934 and US 2007/0243321, both incorporated by reference herein.

U.S. Pat. No. 6,117,934 discloses the non-ionic emulsifying agents of the group of alkylpolyglycosides of formula (I):

$$R^1O(R^2O)_b(Z)_a \qquad (I)$$

wherein $R^1$ is an alkyl group having 5 to 24 carbon atoms, $R^2$ is an alkylene group having 2 to 4 carbon atoms and Z is a saccharide group having 5 or 6 carbon atoms, b is an integer having a value of 0 to 12 and a is an integer having a value of 1 to 6. Preferably, b is 0 and Z is a glucose residue. The alkyl group is preferably linear and may optionally contain up to three carbon-carbon double bonds. As is disclosed in U.S. Pat. No. 6,117,934, the number of saccharide groups, i.e. a, is a statistical mean value.

Betaine has the formula $Me_3N^{(+)}$—$CH_2$—$COO^{(-)}$. In the art quaternary N—$(CH_2)_n$—$X^{(-)}$ compounds (i.e. combinations of a cationic group and an anion group at close distance from each other within one molecule are generally called "betaines", wherein $X^{(-)}$ is an anion, e.g. a halide, a sulfonate or a phosphonate. However, since N-quaternised glycine ($H_2N$—$CH_2$—$COOH$) is betaine, compounds having the formula $Me_3N^{(+)}$—$CH_2$—$COOR$ are in this document indicated as "betaine esters" or "betaine ester derivatives", despite the fact that they lack an anionic group.

Choline has the formula $Me_3N^{(+)}-CH_2-CH_2-OH$ and the esters thereof are in this document indicated as "choline esters" or "choline ester derivatives".

US 2007/0243321 discloses cationic emulsifying agents of the group of betaine esters of formula (II):

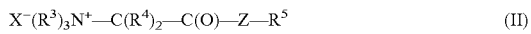
$$X^-(R^3)_3N^+-C(R^4)_2-C(O)-Z-R^5 \qquad (II)$$

wherein X is a sulphonate group, $R^3$ is a linear or branched alkyl group having 1 to 6 carbon atoms, $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon carbon double bonds, with $6 \leq n \leq 12$ and $0 \leq m \leq 3$. If the alkyl group comprises 3-6 carbon atoms, it may also have a cyclic structure and may include one to two heteroatoms selected from the group of nitrogen and oxygen.

Other betaine esters of formula (II) include (not disclosed in US 2007/0243321) include those compounds wherein X is an anion other than a methane sulphonate, paratoluene sulphonate or camphor sulphonate Anion, e.g. a halide, preferably chloride.

US 2005/0038116 discloses $CH_3-(CH_2)_{17}-C(O)-O-(CH_2)_2-^+N(CH_3)_3Cl^-$ (stearoyl choline chloride) and its use for the treatment of certain diseases. This compound can also be used as an emulsifying agent according to the present invention.

WO 2006/066643 discloses esters of choline and fatty acids and cosmetic products comprising such esters. The esters are said to have bactericide activity and have the formula $R-C(O)-O-(CH_2)_2-^+N(CH_3)_3X^-$, wherein R $C_6$-$C_{36}$ alkyl group and $X^-$ is a halogenide, nitrate, phosphate, tosylate or methanesulphonate. Also these esters can be used as an emulsifying agent according to the present invention.

Another group of cationic emulsifying agents are the group of choline ester derivatives of formula (III):

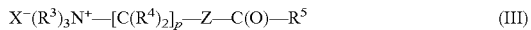
$$X^-(R^3)_3N^+-[C(R^4)_2]_p-Z-C(O)-R^5 \qquad (III)$$

wherein $X^-$ is a counter ion, e.g. a sulphonate group or a halide, $R^3$ is a linear or branched alkyl group having 1 to 6 carbon atoms, p is 1 or 2 (preferably 2), $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon carbon double bonds, with $6 \leq n \leq 12$ and $0 \leq m \leq 3$, or a group having the formula $C_nH_{2n+1}$, wherein $1 \leq n \leq 24$. If the alkyl group comprises 3-6 carbon atoms, it may also have a cyclic structure and may include one to two heteroatoms selected from the group of nitrogen and oxygen. When X— is a sulphonate, it is preferred that X— is a $C_1$-$C_{12}$ monoalkyl sulphonate, wherein the alkyl group may be linear or branched and/or may optionally be interrupted by one or more hetero-atoms selected from O and N. If $X^-$ is a halide, it can in principle be $F^-$, $Cl^-$, $Br^-$ or $I^-$. However, it is preferred that $X^-$ is $Cl^-$.

According to the present invention, cationic emulsifying agents, in particular those according to formulas (II) and (III), are preferred. Most preferably, the cationic emulsifying agents are the choline ester derivatives according to formula (III).

Base materials that are used for the preparation of the cationic emulsifying agents according to formulas (II) and (III) are entirely of vegetable or natural origin. The cationic emulsifying agents according to formulas (II) are disclosed in US 2007/0243321. The cationic emulsifying agents according to formulas (III) are basically derived from choline and fatty acids. Hence, these cationic emulsifying agents are highly biodegradable and are therefore desired for environmental reasons.

The cationic emulsifying agents according to formula (III) may be prepared by various methods. According to a first method, a fatty acid $R^5C(O)OH$ or a suitable derivative thereof, preferably the acid chloride $R^5C(O)Cl$, is reacted with a choline (choline per se has the formula $X^-(R^3)_3N^+-CH_2CH_2OH$) or a choline derivative according to formula (IV):

$$X^-(R^3)_3N^+-[C(R^4)_2]_p-Y \qquad (IV)$$

wherein Y is either OH or Cl and wherein $R^3$, $R^4$ and p are as defined above.

Alternatively, a fatty acid lower alkyl ester $R^5C(O)OR^3$ may be reacted with $(R^3)_2N-[C(R^4)_2]_p-OH$ to provide a tertiary aminoalkylester of the fatty acid, followed by quaternisation with an alkyl halide $R^3X$ (wherein X is chloride, bromine or iodine) or a dialkyl sulphate $(R^3)_2SO_4$. Alternatively, an alcohol $R^5-OH$ may be reacted with chloro acetic acid ($Cl-CH_2-CO_2H$) or a derivative, such as chloroacetyl chloride $Cl-CH_2-C(O)Cl$, to the corresponding ester followed by reaction an amine according to the formula $(R^3)_3N$, to provide a betaine according to formula (II).

The present invention therefore also relates to a method for the preparation of a choline ester derivative according to formula (III):

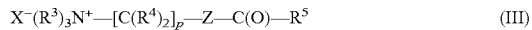
$$X^-(R^3)_3N^+-[C(R^4)_2]_p-Z-C(O)-R^5 \qquad (III)$$

wherein $X^-$ is a counter ion, e.g. a sulphonate group or a halide, $R^3$ is a linear or branched alkyl group having 1 to 6 carbon atoms, $R^4$ is either hydrogen or a linear or branched alkyl group having 1 to 6 carbon atoms, p is 1 or 2, Z is either O or NH, and $R^5$ is a group having the formula $C_nH_{2(2n-m)+1}$, wherein m denotes the number of carbon carbon double bonds, with $6 \leq n \leq 12$ and $0 \leq m \leq 3$, wherein the alkyl group optionally has a cyclic structure and optionally includes one to two heteroatoms selected from the group of nitrogen and oxygen when said alkyl group comprises 3-6 carbon atoms, wherein a fatty acid compound $R^5C(O)P$, wherein P is OH or Cl, is reacted with a choline derivative according to formula (IV):

$$X^-(R^3)_3N^+-[C(R^4)_2]_p-Y \qquad (IV)$$

wherein Y is either OH or Cl and wherein $R^3$, $R^4$ and p are as defined above.

The present invention therefore further relates to a method for the preparation of a choline ester compound according to formula (III):

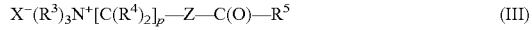
$$X^-(R^3)_3N^+[C(R^4)_2]_p-Z-C(O)-R^5 \qquad (III)$$

wherein $X^-$ is a counter ion, e.g. a sulphonate group or a halide, $R^3$ is a linear or branched alkyl group having 1 to 6 carbon atoms, $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon carbon double bonds, with $6 \leq n \leq 12$ and $0 \leq m \leq 3$, wherein the alkyl group optionally has a cyclic structure and optionally includes one to two heteroatoms selected from the group of nitrogen and oxygen when said alkyl group comprises 3-6 carbon atoms, wherein a compound $R^5-PH$ (wherein P is O, NH or $NR^3$, preferably O) is reacted with chloro acetic acid ($Cl-CH_2-CO_2H$) or chloroacetyl chloride $Cl-CH_2-C(O)Cl$ to the corresponding ester $R^5-P-C(O)-CH_2-Cl$ followed by reaction of said ester or amide with an amine according to the formula $(R^3)_3N$, wherein $R^3$ and $R^5$ have the meaning indicated above.

The emulsion according to the present invention may be used for surface coatings, bonding layers, impregnation layers, dense coated materials and semi-dense coated materials which are cold-cast or storable.

The emulsions according to the present invention may be based on synthetic materials which are used instead of the bitumen/oil phase as is for example disclosed in US 20070105987, incorporated by reference herein. In particular, such emulsions have a low colour and comprise a naphthenic oil having a total content of naphthenics of 35%-80% by weight, based on the total weight of the naphthenic oil, and a petroleum or synthetic hydrocarbon resin, wherein the ratio of the naphthenic oil and the petroleum or synthetic hydrocarbon resin is between 10:90 to 90:10. Additionally, the naphthenic oil has preferably a kinematic viscosity (100° C.) of 20-150 cSt according to ASTM D 445, more preferably of 25-120 cSt and most preferably of 30-100 cSt. Furthermore, the naphthenic oil further comprises polyaromatics and the content thereof is preferably less than 10% by weight, more preferably less than 5% by weight. Sulphur content is also relatively low. It is preferred that the sulphur content according to ASTM D 323 is below 5% by weight, more preferably below 2.5% by weight and most preferably below 1.0% by weight. All these data are based on the total weight of the oil. Also, the naphthenic oil is preferably very light in colour. Accordingly, it is preferred that the naphthenic oil has a colour of less than 100,000 APHA as determined according to ASTM 5386, more preferably less than 50,000 APHA. Such clear and transparent oils enable the use of amounts of pigment that are less than usual, e.g. 1.5 wt. %. For example, if an oil based on an extract obtained by furfural extraction of a Bright Stock (which has usually a colour of more than 100,000 APHA), the amount of pigment must be at least 2 wt. %. Such low colour emulsions may also comprise oils such as Shell BFE and Plaxolene® 50 of Total.

The emulsions according to the present invention may further comprise a wax as is for example disclosed in US 2007199476, incorporated by reference herein, in particular Fischer Tropsch waxes and EBS-based waxes. In particular, the Fischer Tropsch wax has a congealing point of between 85 and 120° C. and a PEN at 43° C., expressed in 0.1 mm, as determined by IP 376 of more than 5.

Preferred (elastomer modified) bitumen emulsions according to the present invention can be characterised as follows:

1. Penetration of recovered bitumen>100 $10^{-1}$ mm

Breaking Index*Storage Stability<1.35, preferably <1.2, more preferably <0.9, wherein the breaking index is not more than 90 and the storage stability is not more than 0.015. The breaking index is determined according to NEN-EN 13075-1 (cf. Table 4 of Example 3) and the storage stability is determined according to NEN 12847 (cf. Table 8 of Example 5; expressed in %, so values must be divided by 100%).

2. Penetration of recovered bitumen≦100 $10^{-1}$ mm

Breaking Index*Storage Stability <1.8, preferably <1.5, more preferably <1.1, most preferably <0.9, wherein the breaking index is not more than 120 and the storage stability is not more than 0.015. The breaking index is determined according to NEN-EN 13075-1 (cf. Table 4 of Example 3) and the storage stability is determined according to NEN 12847 (cf. Table 8 of Example 5 expressed in %, so values must be divided by 100%).

EXAMPLES

Example 1

A scleroglucan (Actigum® CS 6 purchased from IMCD, the Netherlands) mixture with a food grade vegetable oil (purchased from Mosselman N. V., Belgium, or Heybroek B. V., the Netherlands) was prepared by mixing the two components at room temperature in a weight ratio of 1:2. The food grade vegetable oil is protecting the scleroglucan particles to conglomerate in an aqueous medium and hence a homogenous dispersion is obtained when this mixture is added to water whilst stirring.

Emulsions were produced according the following procedure. To 99.232 units of weight of water at a temperature of about 60° C., 0.428 units of weight of a 30% hydrochloric acid solution was added whilst gently stirring. After the addition of 0.24 units of weight of Redicote® E9 fatty amine emulsifier (purchased from Akzo Nobel) to the water, 0.1 units of weight of the scleroglucan-food grade oil (1:2) mixture was added. Both the water and a soft bitumen, i.e. Exxon Mobile bitumen with a penetration ranging from 160-220 $10^{-1}$ mm (ex-Exxon Mobile refinery Antwerp, Belgium) were fed to an Atomix emulsification unit (Emulbitume, France) and were emulsified to an oil in water (O/W) emulsion having a water content of about 40 wt. % water. The storage stability was determined after six days. It appeared that separation of the emulsion had not occurred. The compositions and properties of the emulsions are summarised in Table 1.

TABLE 1

|  | Method of analysis | Result Sample 1 |
| --- | --- | --- |
| Bitumen content (wt. %) | EN 1428 | 61.0 |
| Efflux time (25° C. in sec.) | NEN 3947 | 16 |
| pH (aqueous phase) | EN 12850 | 2.1 |
| Breaking index | NEN-EN 13075-1 | 114 |

In the examples presented below emulsifier content, the content of the scleroglucan—food grade oil (1:2) mixture or the content of other polysaccharides are varied. In these examples the water content is adjusted in such a way that the total mixture contains 100 weight units of material.

Example 2

Aqueous solutions of scleroglucan were prepared by dissolution of the polymer at 50° C. The amounts of the scleroglucan (Actigum® CS 6 purchased from IMCD, The Netherlands)-food grade oil mixture added was varied from 0 to 1 units of weight. The aqueous solution had a pH of 1.9. The solutions were stored at 50° C. for 7 days and subsequently at 60° C. for 5 days. This resulted in a negligibly small viscosity decrease. The viscosity data (cP) were determined using a Brookfield Reometer type DV-11+ equipped with a spindle type 2, and the results are summarised in Table 2.

From the viscosity data shown in Table 2 it appeared that the solutions were stable for at least 12 days when stored at a temperature of 50° C. or even higher.

Similar experiments were performed with other polysaccharides, e.g. starch and cellulose, including Natrosol® Plus 331 and 430 (data sheet 23.103-E5) of Hercules, and derivatives of these polysaccharides, but for all these materials the viscosity decreased significantly in time.

TABLE 2

| wt. % Actigum ® CS 6 - food grade oil (1:2) mixture | After 2 hrs | Day 1 | Day 2 | Day 5 | Day 7 | Day 8 | Day 12 |
|---|---|---|---|---|---|---|---|
| 0.05 | 10 | 9 | 10 | 10 | 9 | 8 | 9 |
| 0.2 | ND | ND | 17 | 17 | ND | 15 | 15 |
| 0.4 | 26 | 38 | 40 | 41 | 40 | 40 | ND |
| 0.6 | 39 | 59 | 62 | 65 | 62 | 61 | 64 |
| 0.8 | 75 | 92 | 91 | 93 | 93 | 91 | 94 |
| 1.0 | 102 | 128 | 127 | 131 | 134 | 127 | 134 |

Comparative Example 1

An emulsion having an aqueous phase of about 41 wt. % was prepared according to the procedure of Example 1 with the exception that instead of a 160-200 bitumen a 20-30 $10^{-1}$ mm bitumen was used (ex-Total refinery in Dunkirk, France) and that the scleroglucan was substituted by Natrosol® 250 HR (a hydroxyethylcellulose; purchased from Barentz, Hoofddorp, The Netherlands). The amounts of the Natrosol®-food grade oil (1:2) mixture added were 0.22 wt. %, 0.59 wt. % and 0.80 wt. %, respectively. The sample comprising 0.80 wt. % of Natrosol® was further analysed. The aqueous phase was 41.0 wt. %. The viscosity of the sample was 40 s (ISO 4 mm, 25° C. measured according to NEN 3947). The pH of the aqueous phase was 2.3. The breaking index according to NEN-EN 13075-1; at 20° C.) was 97. All these emulsions were stable for at least one week when stored at a temperature of 22° C. However, after three weeks, a layer of bitumen having a thickness of about 5 mm was formed on the bottom of the storage vessel. The emulsions could not be restored or homogenized by stirring. This example therefore demonstrates the unsuitability of polysaccharides such as hydroxyethylcelluloses as stabilising agents because a significant drop in viscosity is observed when these materials are stored at temperatures>50° C. in an acidic environment (pH≈2).

Comparative Example 2

Solutions were prepared according to the procedure described in Comparative Example 1 but in this case with the addition of varying contents of the Natrosol®-food grade oil mixture instead of the scleroglucan-food grade oil (1:2) mixture. The emulsions were stored at 50° C. for 11 days. Viscosity data (cP) determined using a Brookfield Reometer type DV-11+ equipped with a spindle type 2 are summarised in Table 3.

TABLE 3

| wt. % Natrosol ® - food grade oil (1:2) mixture | After 2 hrs | Day 1 | Day 4 | Day 5 | Day 8 | Day 11 |
|---|---|---|---|---|---|---|
| 0.2 | 12.2 | 10.8 | 10.2 | 9.2 | 9.2 | 9.6 |
| 0.4 | 15.2 | 13.2 | 11.4 | 11.2 | 10.8 | 10.4 |
| 0.6 | 19.0 | 16.0 | 13.0 | 12.2 | 11.4 | 10.0 |
| 0.8 | 24.8 | 19.6 | 14.6 | 14.2 | 12.6 | 12.0 |
| 1.0 | 33.6 | 24.6 | 16.6 | 15.4 | 13.2 | 13.0 |
| 1.5 | 53.0 | 34.4 | 20.8 | 19.2 | 16.6 | 15.0 |

The data in Table 3 clearly show that Natrosol® is a less efficient emulsion stabiliser than scleroglucan since the viscosity, in particular at high concentrations of the emulsion stabiliser, decreases.

Example 3

Bitumen emulsions were produced according to the procedure as described in Example 1, but with different Actigum® CS 6-food grade oil (1:2) mixtures ranging from 0.0 to 0.2 wt. % (0.0-0.067 wt % of scleroglucan). These mixtures contained about 83 wt. % of pure Actigum® CS 6, based on the total weight of the mixture, wherein the remainder is moisture. Hence, a value of 0.05% (cf. e.g. Table 4) corresponds to an amount of about 0.0042 wt. % pure Actigum® CS 6. These corrected values are shown in brackets.

TABLE 4

| | Method of analysis | 0% | 0.05% (0.0042%) | 0.07% (0.0058%) | 0.09% (0.0075%) | 0.1% (0.0083%) | 0.2% (0.0166%) |
|---|---|---|---|---|---|---|---|
| Water content % | EN 1428 | 42.1 | 41.9 | 42.0 | 41.6 | 42.3 | 42.6 |
| Efflux time (25° C. in sec.) | NEN 3947 | 23 | 28 | 30 | 32 | 28 | 33 |
| pH | EN 12850 | 2.3 | 2.4 | 2.4 | 2.4 | 2.3 | 2.3 |
| Breaking index (20° C.) | NEN-EN 13075-1 | 86 | 89 | 87 | 88 | 87 | 87 |

Only a slight increase in the viscosity is observed at increasing Actigum® CS 6 content. Note that the Actigum® CS 6 added is only one third of the Actigum® CS 6-food grade oil (1:2) mixture.

All these samples were subjected to the storage stability test EN 12847 after 7 days of storage at ambient temperatures (18-22° C.) and the results are presented in Table 5.

TABLE 5

| wt. % Actigum ® CS 6 - food grade oil (1:2) mixture | Initial water content % | Upper layer % | Lower layer % | ST = Upper layer − lower layer % |
|---|---|---|---|---|
| 0.0% | 42.1 | 50.2 | 36.5 | 13.7 |
| 0.05% (0.0042%) | 41.9 | 43.6 | 40.7 | 2.9 |
| 0.07% (0.0058%) | 42.0 | 42.9 | 40.9 | 2.0 |
| 0.09% (0.0075%) | 41.6 | 42.5 | 41.3 | 1.2 |
| 0.1% (0.0083%) | 42.3 | 43.0 | 41.5 | 1.5 |
| 0.2% (0.0166%) | 42.6 | 43.2 | 42.5 | 0.7 |

The storage stability is noticeably is improved, when only as very small amount of Actigum® CS 6 is added.

Example 4

Emulsions were prepared according to the procedure as described in Example 1 from 160-220 $10^{-1}$ mm bitumen (ex-ExxonMobil, Antwerp, Belgium refinery), from bitumen 20-30 $10^{-1}$ mm (ex-Total Dunkirk, France refinery) and from 35-50 $10^{-1}$ mm bitumen (ex-Total Dunkirk, France refinery). The amount of the Actigum® CS 6-food grade oil (1:2) mixture added was varied between 0.0 wt. % and 0.2 wt. %. All emulsions demonstrated excellent storage stability.

The emulsions were applied onto stainless steel lids (0.45 kg/m$^2$) and dried under ambient conditions. After the emulsions had dried (after 3 hr), the lids were weighted and the surface of the lids was visually inspected. The surface was inspected manually and visually. The drying emulsion was judged as "dry" when the emulsion was visually solidified and no bitumen was released to the finger while touching. The drying emulsion was judged as "emulsion" when no visual solidification was observed and the viscosity was still low. The intermediate phase between "dry" and "emulsion" was judge as the "cheese" phase, i.e., when the viscosity of the drying emulsion has significantly increased, but the material still releases bitumen while touching. The data are summarised in Table 6.

TABLE 6

| Emulsion from bitumen | After 1 hr of drying at ambient conditions % surface | | | After 2 hr of drying at ambient conditions % surface | | |
|---|---|---|---|---|---|---|
| | dry | cheese | emulsion | dry | cheese | emulsion |
| 20-30 | 70 | 20 | 10 | 90 | 10 | 0 |
| 35-50 | 50 | 10 | 30 | 70 | 30 | 0 |
| 160-220 | 10 | 90 | 0 | 50 | 50 | 0 |

Although the analysis is not fully quantitative, the table shows that storage-stable, fast-breaking bitumen emulsions can be produced from low penetration grade bitumen, even as low as a penetration of 20-30 $10^{-1}$ mm.

Example 5

Bitumen emulsions were produced according to the procedure as described in Example 1 but different bitumen grades were used now in this example, i.e. 40-60 $10^{-1}$ mm (ex-Total Antwerp Belgium refinery), 35-50 $10^{-1}$ mm and 20-30 $10^{-1}$ mm (both from ex-Total Dunkirk France refinery. For these emulsions, a double amount of the Actigum® CS 6-food grade oil (1:2) mixture was used (0.2 wt. %) Emulsion properties are listed in Table 7 below.

TABLE 7

| | Method of analysis | 20-30 $10^{-1}$ mm | 35-50 $10^{-1}$ mm | 40-60 $10^{-1}$ mm |
|---|---|---|---|---|
| Water content % | EN 1428 | 41.2 | 41.1 | 41.2 |
| Efflux time (25° C. in sec.) | NEN 3947 | 41 | 33 | 32 |
| pH | EN 12850 | 2.4 | 2.4 | 2.4 |
| Breaking index (20° C.) | NEN-EN 13075-1 | 103 | 112 | 114 |
| Pen. bitumen | EN 1426 | 21 | 43 | 53 |

TABLE 8

| | Initial water content % | Water content Upper layer % | Water content Lower layer % | ST = Upper layer − lower layer % |
|---|---|---|---|---|
| 20-30 $10^{-1}$ mm | 41.2 | 41.4 | 40.1 | 1.3 |
| 35-50 $10^{-1}$ mm | 41.1 | 41.4 | 40.2 | 1.2 |
| 40-60 $10^{-1}$ mm | 41.2 | 41.7 | 40.7 | 1.0 |

The storage stability was measured according to NEN 12847 after 7 days of storage at ambient temperatures (18-22° C.) and the results are presented in Table 8.

This example clearly demonstrates that very storage stable bitumen emulsions can be produced by using only a small amount of Actigum® CS 6 in the water phase.

Example 6

A bitumen emulsion was prepared according to the procedure as described in Example 1. A 40-60 $10^{-1}$ mm bitumen was used (ex-Total Antwerp Belgium refinery) and 0.14 units of weight of a Actigum® CS 6-food grade oil (1:2) mixture was used. Prior to emulsification, the water mixture was filtered using a glass wool filter so Actigum® CS 6 particles, which were not dissolved, were removed from the aqueous phase. It was not possible to quantify the amount of Actigum® CS 6 recovered by filtration as most of the material was filtered off. However, the results with regard to the storage stability of the emulsion used was similar as the storage stability for the unfiltered material. The results are presented in Table 9.

TABLE 9

| | Method of analysis | 40-60 $10^{-1}$ mm (filtered) | 40-60 $10^{-1}$ mm (unfiltered) |
|---|---|---|---|
| Water content % | EN 1428 | 43.9 | 41.2 |
| Efflux time (25° C. in sec.) | NEN 3947 | 27 | 32 |
| pH | EN 12850 | 2.2 | 2.4 |
| Breaking index (20° C.) | NEN-EN 13075-1 | 116 | 114 |
| Pen. bitumen | EN 1426 | 53 | 53 |

TABLE 10

| | Initial water content % | Water content Upper layer % | Water content Lower layer % | ST = Upper layer − lower layer % |
|---|---|---|---|---|
| 40-60 $10^{-1}$ mm (filtered) | 43.9 | 44.4 | 43.0 | 1.4 |
| 40-60 $10^{-1}$ mm (unfiltered) | 41.2 | 41.7 | 40.7 | 1.0 |

Example 7

A challenge is to emulsify a 10-20 $10^{-1}$ mm bitumen (ex Total Dunkirk France refinery) as this material is a glass-like material with a relatively high softening point (ring&ball temperature>>55° C.).

The emulsification process with the 0% Actigum® CS 6 addition (Sample I) was not stable. However, it was possible to collect a sample which was stable for at least one day. The properties of the sample are presented in the Table 11. The emulsification with the 0.2 wt. % addition of an Actigum® CS 6-food grade vegetable oil (1:2) mixture (Sample II) went much more smoothly and it was possible to continuously produce a homogeneous emulsion.

TABLE 11

|  | Method of analysis | Sample I 0% | Sample II 0.2% |
|---|---|---|---|
| Water content | EN 1428 | 40.0 | 39.8 |
| Efflux time (25° C. in sec.) | NEN 3947 | 25 | 35 |
| pH | EN 12850 | 2.2 | 2.2 |
| Breaking index (20° C.) | NEN-EN 13075-1 | 118 | 116 |

The storage stability of these samples was judged visually (Table 12).

TABLE 12

|  | Visual inspection |
|---|---|
| Sample I (0%) after one day | Separation was clearly visible, solid bitumen layer on the bottom |
| Sample II (0.2%) after one day | Homogeneous emulsion, no separation |
| Sample I (0%) after 6 days | Almost full separation of the bitumen and the water phase |
| Sample II (0.2%) after 6 days | Homogeneous emulsion, no separation |

Example 8

A trackless tack coat was produced on a large scale from a 20-30 $10^{-1}$ mm bitumen manufactured by Total Dunkerque, France. To about 10.000 L of water, HCl was added to obtain a pH of 1.8, and 0.24 wt. % of Redicote® E9 fatty amine emulsifier (purchased from Akzo Nobel) and 0.14 wt. % of a slurry consisting of 1 part by weight of a commercially available scleroglucan (Actigum® CS 6 purchased from IMCD, the Netherlands) and 2 parts by weight of a Rapeseed Oil (Food Grade, purchased from Heybroek B. V., The Netherlands) were added. This mixture was homogenized for 5 minutes at a temperature of 48°-52° C. The bitumen was cooled down from the delivery temperature of about 190° C. to 150° C. The water, containing scleroglucan and emulsifier, and the bitumen were fed to a colloid mill, Siever® type SM-290/HK in a volume ratio of about 2:3 at a total throughput of approx. 157 kg/min. The obtained emulsion was subsequently pumped through a heat exchanger and was cooled down to a temperature of 30° C. After production, this emulsion was blended in a ratio of about 9:1 with a commercially available tack coat based on 160-210 bitumen, which was obtained from Latexfalt B. V. Koudekerk aan den Rijn, The Netherlands.

The resulting properties of this emulsion are listed in Table 13.

TABLE 13

|  | Method of analysis | Sample produced on large scale |
|---|---|---|
| Water content | EN 1428 | 40.9 |
| Efflux time (25° C. in sec.) | NEN 3947 | 31 |
| pH | EN 12850 | 2.1 |
| Breaking index (20° C.) | NEN-EN 13075-1 | 104 |

The obtained tack coat was sprayed by a third party contractor MNO-Vervat, using a Bremag spray bar equipped with standard nozzles for tack coat spraying. No additional measures were taken by the operator compared to the spraying of commercially available tack coats and pumping, filtration and spraying took place in a standard fashion. Breaking of the emulsion occurred within a 2 minutes time frame after application and a smooth, homogeneous tack coat film was obtained. During one of the jobs, it started to rain 20 minutes after application and no leaching of bitumen to the water phase was observed. Trafficking of the tack coat by asphalt trucks 10 minutes after application did not result in contamination of the truck tires by the bituminous tack coat and the subsequent deposition of bitumen onto clean asphalt or concrete surfaces.

Example 9

Apparatus and Materials

Molecular characterization of the prepared compounds was performed by NMR spectroscopy using a Varian Mercury Vx 400 MHz, where spectra were recorded at a temperature of 298 K, and infrared spectroscopy using a Perkin Elmer 1600 FT-IR.

Reagents, catalysts, chemicals, materials and solvents were obtained commercially and were used without further purification except dichloromethane, which was distilled from molsieves to remove water and ethanol and was stored on molsieves. The molsieves that were used were dried in an oven at 500° C.

Octadecanoyl chloride: A solution of oxalyl chloride (53.5 g, 422 mmol) in 150 mL of chloroform was added drop wise to a solution of stearic acid (30.0 g, 105 mmol) in 250 mL of chloroform. After stirring overnight at ambient temperature the solution was concentrated and co-evaporated twice with chloroform. Drying under vacuum for 1 hour yielded a quantitative yield of a white solid. $^1$H-NMR (CDCl$_3$): δ=2.85 (t, 2H), 1.70 (q, 2H), 1.30 (m, 28H), 0.85 (t, 3H) ppm. $^{13}$C-NMR (CDCl$_3$): δ=173.6, 47.1, 31.9, 29.7, 29.7, 29.6, 29.5, 29.4, 29.3, 29.1, 28.4, 25.1, 22.7, 14.1 ppm. FT-IR: ν=2292, 2853, 1799 (C=O stretch), 1466, 953, 720, 680 cm$^{-1}$.

N,N,N-trimethyl-2-(stearoyloxy)ethan-1-aminium: A solution of octadecanoyl chloride (35.0 g, 116 mmol) and choline chloride (Me$_3$N$^+$Cl$^-$)—CH$_2$CH$_2$—OH (16.1 g, 116 mmol) in 400 mL of dichloromethane was refluxed overnight. The solution was concentrated and diluted with 400 mL of diethyl ether giving a precipitate. The precipitate was collected by filtration and washed thoroughly with diethyl ether. The crude product was dissolved in refluxing acetonitrile (250 mL). After cooling to approximately 70° C. the precipitate was filtered off, washed with warm acetonitrile and dried. The crude product was dissolved in refluxing THF (250 mL). After cooling to approximately 55° C. the precipitate was filtered and washed with warm THF. Overnight drying in a vacuum oven at 40° C. yielded 33.8 g (72%) of a white powder. $^1$H-NMR (CDCl$_3$): δ=4.58 (t, 2H), 4.17 (t, 2H), 3.58 (s, 9H), 2.37 (t, 2H), 1.60 (q, 2H), 1.30 (m, 28H), 0.85 (t, 3H) ppm. $^{13}$C-NMR (CDCl$_3$): δ=172.7, 64.7, 57.8, 54.1, 34.0, 31.9, 29.6, 29.6, 29.6, 29.4, 29.3, 29.2, 29.1, 24.6, 22.6, 14.1 ppm. FT-IR: ν=3407, 2919, 2850, 1731 (C=O stretch), 1473, 1154 (C—O stretch), 952, 718 cm$^{-1}$.

Octadecyl 2-chloroacetate: A solution of 1-octadecanol 5 (5 0 g, 180 mmol), chloroacetic acid (17.5 g, 180 mmol) and concentrated sulfuric acid (0.1 mL) in 350 mL of toluene was refluxed overnight in a flask equipped with a Dean-Stark trap. The solution was diluted with 500 mL of diethyl ether and extracted twice with a saturated bicarbonate solution (500 mL). The aqueous phase was subsequently extracted with 400 mL of diethyl ether. The combined organic layers were dried with sodium sulfate and evaporated in vacuo yielding a brown solid, which was used without further purification. $^1$H-NMR (CDCl$_3$) δ=4.20 (t, 2H), 4.07 (s, 2H), 1.68 (q, 2H), 1.30 (m, 30H), 0.89 (t, 3H) ppm. FT-IR: ν=2919, 2851, 1749 (C=O stretch), 1333, 1208 (C—O stretch), 786 cm$^{-1}$.

N,N,N-trimethyl-2-(octadecyloxy)-2-oxoethan-1-aminium: To octadecyl 2-chloroacetate (64 g, 180 mmol) was added 176 mL of a 27 wt % solution of trimethylamine in diethyl ether. Overnight stirring under a closed atmosphere at room temperature yielded a precipitate, which was collected by filtration. Washing with 750 mL of diethyl ether yielded an off-white solid. The collected filtrate was evaporated in vacuo yielding 27 g of a slightly yellow solid consisting of unreacted octadecyl 2-chloroacetate. To this solid was again added 74 mL of a 27 wt % solution of trimethylamine in diethyl ether. Overnight stirring under a closed atmosphere at room temperature yielded a precipitate, which was collected by filtration. Washing with 375 mL of diethyl ether yielded a white solid. The residual solids of reaction 1 and 2 were combined and dried in a vacuum oven at 40° C. yielding 60 g (80%) of the desired product. $^1$H-NMR (CDCl$_3$): δ=5.07 (s, 2H), 4.19 (t, 2H), 3.69 (s, 9H), 1.64 (q, 2H), 1.25 (m, 30H), 0.89 (t, 3H) ppm. $^{13}$C-NMR (CDCl$_3$): δ=165.0, 66.7, 62.9, 54.0, 31.9, 29.6, 29.6, 29.5, 29.4, 29.3, 29.1, 28.2, 25.6, 22.6, 14.1 ppm. FT-IR: ν=2918, 2849, 1731 (C=O stretch), 1471, 1262, 1215, (C—O stretch), 722 cm$^{-1}$.

Example 10

A bitumen emulsion was re-produced according to the description given in Example 1 (Ref Sample). Two other emulsions were produced according to the same procedure, however, for these emulsions the two new bio-emulsifiers, viz, the betaine and the choline based emulsifiers, were used as described in Example 9 as a substitute for the Redicote® E9 fatty amine emulsifier. For the betaine (Sample I), 0.6 units of weight were used and for the choline (Sample II) 0.5 units of weight were used for the formulation of the water phase. The properties of the emulsions are listed in Table 14.

TABLE 14

|  | Method of analysis | Sample I | Sample II | Ref Sample |
|---|---|---|---|---|
| Water content % | EN 1428 | 44.3 | 42.7 | 43.1 |
| Efflux time (25° C. in sec.) | NEN 3947 | 110 | 44 | 31 |
| pH | EN 12850 | 2.3 | 2.4 | 2.3 |
| Breaking index (20° C.) | NEN-EN 13075-1 | 96 | 110 | 86 |
| Volume average particle size μm | See description below | 27 | 14 | 7.4 |
| Volume fraction of particles >8 μm. | See description below | 85 | 65 | 25 |

Also with these bio-compatible emulsifiers, which a very low eco-toxicity, an excellent storage stability of the emulsions is obtained as is shown in the table below The storage stability of these samples after 7 days, measured according to the EN 12847 method of analysis, are presented in Table 15.

TABLE 15

|  | Initial water content % | Water content Upper layer % | Water content Lower layer % | ST = Upper layer − lower layer % |
|---|---|---|---|---|
| Sample I | 44.3 | 44.5 | 43.9 | 0.6 |
| Sample II | 42.7 | 43.8 | 42.1 | 1.7 |
| Ref. Sample | 43.1 | 43.7 | 42.9 | 0.8 |

The fractions of the lower at the upper layers were collected are the average particle size and the volume fraction with a particle size>8 μm were determined according to the method described below.

TABLE 16

|  | Upper layer | | Lower layer | |
|---|---|---|---|---|
|  | Average particle size μm | Volume fraction >8 μm % | Average particle size μm | Volume fraction >8 μm % |
| Sample I | 25.9 | 83 | 24.8 | 83 |
| Sample II | 16.4 | 66 | 16.6 | 67 |
| Ref. Sample | 9.1 | 28 | 7.8 | 26 |

Particle Size Distribution Measurement

The particle size distribution of the emulsions was measured using a Microtrac S3500 particle size analyzer. One part of emulsion is diluted with one part of water to which 0.5% TEGO ADDIBIT EK7A (purchased from Goldschmidt GmbH, Essen, Germany) was added. One droplet of the diluted emulsion is fed to the particle size analyzer and after three consecutive measurements (1.5 minutes per measurement) the average particle size ($M_v$ in μm) and the volume fraction of particles above a certain diameter (particles>8 μm in %) are calculated from these measurements by the computer program supplied by the manufacturer of the Microtrac S3500. The calculated values are the average values of the three measurements.

The invention claimed is:

1. An emulsion, comprising
   a bituminous binder; and
   0.005 wt % to 0.02 wt % of a non-modified scleroglucan, based on the total weight of the emulsion,
   wherein the bituminous binder comprises a bitumen having a penetration of about 100×10$^{-1}$ mm or less, according to ASTM D5-97, wherein the emulsion has a Breaking Index times a Storage Stability less than 1.8, and wherein a maximum value of the Breaking Index is less than or equal to 120 and a maximum value of the Storage Stability is less than or equal to 0.015.

2. The emulsion according to claim 1, wherein the emulsion comprises 0.005 wt % to 0.015 wt % of the non-modified scleroglucan, based on the total weight of the emulsion.

3. The emulsion according to claim 1, wherein the bitumen has a penetration of about 10×10$^{-1}$ mm to about 100×10$^{-1}$ mm, according to ASTM D5-97.

4. The emulsion according to claim 1 further comprising an emulsifying agent selected from the group consisting of anionic, cationic, non-ionic, and amphoteric emulsifying agents.

5. The emulsion according to claim 1, further comprising a biodegradable emulsifying agent.

6. The emulsion according to claim 5, wherein the biodegradable emulsifying agent is selected from betaine esters of formula (II):

$$X^-(R^3)_3N^+-C(R^4)_2-C(O)-Z-R^5 \qquad (II)$$

wherein $X^-$ is a $C_1$-$C_{12}$ hydrocarbyl sulphonate group, $R^3$ is a linear or branched alkyl group having 1 to 6 carbon atoms, $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon to carbon double bonds, with $6 \leq n \leq 12$ and $0 \leq m \leq 3$.

7. The emulsion according to claim 1, wherein the bituminous binder is a paraffinic bitumen or a naphthenic bitumen.

8. The emulsion according to claim 1, wherein the bituminous binder further comprises an elastomer.

9. The emulsion according to claim 5, wherein the emulsion comprises about 0.01 wt % to about 20 wt % of the biodegradable emulsifying agent, based on the total weight of the emulsion.

10. The emulsion according to claim 6, wherein the hydrocarbyl sulphonate group is a linear or branched alkyl sulphonate group, an aryl sulphonate group, an alkaryl sulphonate group, an arylalkyl sulphonate group, or a mixture thereof.

11. The emulsion according to claim 1, wherein the emulsion further comprises an emulsifying agent selected from alkylpolyglycosides of formula (I):

$$R^1O(R^2O)_b(Z)_a \qquad (I)$$

wherein $R^1$ is an alkyl group having 5 to 24 carbon atoms, $R^2$ is an alkylene group having 2 to 4 carbon atoms and Z is a saccharide group having 5 or 6 carbon atoms, b is an integer having a value of 0 to 12, and a is an integer having a value of 1 to 6.

12. The emulsion according to claim 5, wherein the biodegradable emulsifying agent is selected from choline ester derivatives of formula (III):

$$X^-(R^3)_3N^+-[C(R^4)_2]_p-Z-C(O)-R^5 \qquad (III)$$

wherein $X^-$ is a sulphonate group or a halide, $R^3$ is a linear or branched alkyl group having 1 to 6 carbon atoms, p is 1 or 2, $R^4$ is either hydrogen or a linear or branched alkyl group having 1 to 6 carbon atoms, Z is either O or NH, and $R^5$ is a group having the formula $C_nH_{2(2n-m)+1}$, wherein m denotes the number of carbon to carbon double bonds, with $6 \leq n \leq 12$ and $0 \leq m \leq 3$ or a group having the formula $C_nH_{2n+1}$, wherein $1 \leq n \leq 24$.

13. An emulsion, comprising:
a bituminous binder composition; and
0.005 wt % to 0.02 wt % of a non-modified scleroglucan, based on the total weight of the emulsion,
wherein the bituminous binder composition comprises a blend of about 80 wt % to about 98 wt % of a first bitumen and about 2 wt % to about 20 wt % of a second bitumen, wherein the first bitumen has a penetration of about $10 \times 10^{-1}$ mm to about $100 \times 10^{-1}$ mm, according to ASTM D5-97, and wherein the second bitumen has a penetration of about $100 \times 10^{-1}$ mm to about $350 \times 10^{-1}$ mm, according to ASTM D5-97.

14. The emulsion according to claim 13, wherein the emulsion comprises 0.005 wt % to 0.015 wt % of the non-modified scleroglucan, based on the total weight of the emulsion.

15. The emulsion according to claim 13, further comprising a biodegradable emulsifying agent.

16. A bituminous binder composition, comprising:
an emulsion comprising 0.005 wt % to 0.02 wt % of a non-modified scleroglucan, based on the total weight of the emulsion; and an emulsifying agent selected from alkylpolyglycosides of formula (I):

$$R^1O(R^2O)_b(Z)_a \qquad (I)$$

wherein $R^1$ is an alkyl group having 5 to 24 carbon atoms, $R^2$ is an alkylene group having 2 to 4 carbon atoms and Z is a saccharide group having 5 or 6 carbon atoms, b is an integer having a value of 0 to 12, and a is an integer having a value of 1 to 6.

17. The bituminous binder composition according to claim 16, wherein the bituminous binder composition comprises a bitumen having a penetration of about $10 \times 10^{-1}$ mm to about $100 \times 10^{-1}$ mm, according to ASTM D5-97.

18. The bituminous binder composition according to claim 16, wherein the bituminous binder composition comprises a bitumen having a penetration of about $100 \times 10^{-1}$ mm to about $350 \times 10^{-1}$ mm, according to ASTM D5-97.

19. The bituminous binder composition according to claim 16, wherein the bituminous binder composition comprises a blend of about 80 wt % to about 98 wt % of a first bitumen and about 2 wt % to about 20 wt % of a second bitumen, wherein the first bitumen has a penetration of about $10 \times 10^{-1}$ mm to about $100 \times 10^{-1}$ mm, according to ASTM D5-97, and wherein the second bitumen has a penetration of about $100 \times 10^{-1}$ mm to about $350 \times 10^{-1}$ mm, according to ASTM D5-97.

20. A bituminous emulsion, comprising:
0.005 wt % to 0.02 wt % of a non-modified scleroglucan;
30 wt % to 70 wt % of a binder selected from the group consisting of paraffinic and naphthenic bitumens;
0.02 wt % to 0.2 wt % of an emulsifying agent, based on a total weight of the binder; and
an acid, wherein the emulsion has a pH of about 2.4 or less and a storage stability less than 0.015, as measured according to NEN 12847.

* * * * *